United States Patent
Maeda

(10) Patent No.: US 7,257,578 B2
(45) Date of Patent: Aug. 14, 2007

(54) CONTROL DEVICE CAPABLE OF DATA COMMUNICATION AND TRANSMISSION SYSTEM PROVIDED THEREWITH

(75) Inventor: Kingo Maeda, Yamatokoriyama (JP)

(73) Assignee: Mori Seiki Co., Ltd., Yamatokoriyama-shi (JP)

(*) Notice: Subject to any disclaimer, the term of this patent is extended or adjusted under 35 U.S.C. 154(b) by 394 days.

(21) Appl. No.: 10/460,254

(22) Filed: Jun. 13, 2003

(65) Prior Publication Data

US 2003/0233355 A1 Dec. 18, 2003

(30) Foreign Application Priority Data

Jun. 14, 2002 (JP) ............................. 2002-174397

(51) Int. Cl.
*G06F 17/30* (2006.01)
(52) U.S. Cl. .................... 707/9; 707/1; 707/2; 707/10; 709/217; 709/218; 700/3; 700/173
(58) Field of Classification Search .................... 707/1, 707/2, 10, 203; 709/217–218; 700/3, 173
See application file for complete search history.

(56) References Cited

U.S. PATENT DOCUMENTS

| 4,281,379 | A | * | 7/1981 | Austin | ........................... | 700/3 |
|---|---|---|---|---|---|---|
| 5,248,924 | A | * | 9/1993 | Niwa | ........................... | 318/569 |
| 5,684,708 | A | * | 11/1997 | Kondou et al. | ............. | 700/173 |
| 6,438,445 | B1 | * | 8/2002 | Yoshida et al. | ............. | 700/173 |
| 6,675,061 | B2 | * | 1/2004 | Hirai et al. | ................. | 700/189 |
| 2002/0174369 | A1 | * | 11/2002 | Miyazaki et al. | ........... | 713/202 |
| 2005/0038552 | A1 | * | 2/2005 | Sagawa et al. | ............. | 700/181 |

FOREIGN PATENT DOCUMENTS

| JP | 6-324720 | 11/1994 |
|---|---|---|
| JP | 11-212608 | 8/1999 |
| JP | 2000-276508 | 10/2000 |

\* cited by examiner

*Primary Examiner*—Khanh B. Pham
(74) *Attorney, Agent, or Firm*—Westerman, Hattori, Daniels & Adrian, LLP.

(57) ABSTRACT

A data transmission system in accordance with the present invention is configured so that a control device 29 of an NC machine tool 20 may be connected to a data management device via a network 2. The control device 29 comprises a data storage section 32 which stores data, a setting data storage section 41 which stores setting data for determining whether or not to approve a transmission and/or reception for every data stored in the data storage section 32, and a data transmission/reception section 42 which is configured so that a transmission and/or reception process may be performed only on data which has been approved for transmission and/or reception by referring to the setting data stored in the setting data storage section 41.

2 Claims, 3 Drawing Sheets

FIG. 4

| Machining program input, update | ON |
|---|---|
| Machining program output | ON |
| Tool offset amounts input, update | ON |
| Tool offset amounts output | ON |
| Pitch error compensation amounts input, update | OFF |
| Pitch error compensation amounts output | OFF |
| ⋮ | ⋮ |

FIG. 5

| Machining program transmission | ON |
|---|---|
| Machining program reception | ON |
| Tool offset amounts transmission | ON |
| Tool offset amounts reception | OFF |
| Pitch error compensation amounts transmission | ON |
| Pitch error compensation amounts reception | ON |
| ⋮ | ⋮ |

CONTROL DEVICE CAPABLE OF DATA COMMUNICATION AND TRANSMISSION SYSTEM PROVIDED THEREWITH

BACKGROUND OF THE INVENTION

1. Field of the Invention

The present invention relates to a control device of a data transmission system configured so as to connect said control device to a management device via network, wherein said control device numerically controls operation of a machining motion mechanism of an NC machine tool and is arranged to make it capable of data communication, and to the transmission system.

2. Description of the Prior Art

An NC machine tool comprises a machining motion mechanism, such as a main spindle unit and a feed mechanism or the like which are a motion mechanism for machining a work piece, and a control device which controls operation of this machining motion mechanism, and this control is performed based on various kinds of data for use in control, such as those for machining program, amounts of pitch error compensation, and amounts of tool offset.

Said data for use in control is stored in a suitable storage section of the control device, and can be updated and outputted via an input/output device arranged in the operating panel or the like as needed.

In addition, said data for use in control is roughly classified into two categories: one needs to be updated in order for an operator of the NC machine tool to perform suitable machining operation as the need arises as represented by the amounts of tool offset; and the other is related to fundamental performance of the NC machine tool, such as a time constant used for control of a main spindle motor and a feed motor. Then, with regard to the former, in general, the operator can update it freely, and with regard to the latter, it is set so that the operator cannot update it but only a maintainer well versed in the NC machine tool can perform the necessary update.

By the way, in recent years, by connecting each control device of a plurality of NC machine tools to a data management device via network such as LAN, a central management of the data stored in each control device through the data management device has been performed as a way for transferring the data stored in each control device to the data management device for storing the same therein, and on the contrary, for suitably sending the data from the data management device to each control device for use in updating the data stored in each control device.

Then, formerly, a data update by said data management device has become available for all data stored in each control device, for this reason, on data, such as said amounts of tool offset, which need to be updated in order for the operator to perform suitable machining as the need arises, the update has also been made available by said data management device.

However, in a situation where the update can be freely performed by the data management device side on said amounts of tool offset or the like, since it may happen that data, such as the amounts of tool offset, is accidentally updated by the data management device when the operator does not become aware, there has been a fear that machining accuracy would decrease, or a serious accident caused by interference between a tool and a work piece might happen.

The present invention is made in view of the above actual situation, the object thereof is to provide the control device which is arranged to become capable of data communication and can increase the security of the data stored therein, and the transmission system provided therewith.

SUMMARY OF THE INVENTION

The present invention for achieving above objective relates to a control device of a data transmission system configured so as to connect said control device to a management device via network, wherein said control device numerically controls operation of a machining motion mechanism of an NC machine tool and is arranged being capable of data communication, and to the transmission system.

Then, said control device, comprises: data storage means for storing at least data for use in control for numerically controlling said machining motion mechanism; data transmission/reception means for performing a process which transmits data stored in said data storage means to said data management device according to a request from said data management device, while performing a process which receives data transmitted from said data management device and updates the data stored in said data storage means by the received data; and setting data storage means for storing setting data for determining whether or not to approve a transmission and/or reception for every data stored in said data storage means, wherein said data transmission/reception means is configured so that said transmission and/or reception process may be performed only on the data which has been approved for the transmission and/or reception by referring to setting data stored in said setting data storage means.

In this data transmission system, the data stored in the data storage means is transmitted by said data transmission/reception means to said data management device according to the request from said data management device, and the data stored in the data storage means is updated by the data transmitted from said data management device.

Then, the data transmission/reception means performs said transmission and/or reception process only on the data which has been approved for the transmission and/or reception by referring to the setting data stored in the setting data storage means. Incidentally, it is arbitrarily set up for every data stored in said data storage means whether its transmission and/or reception will be approved or not.

Thus, according to this data transmission system, since the transmittable/receivable data between the control device and the data management device can be selectively set up for every data according to importance or the like, for example, on the data which needs to be update in order for the operator to perform suitable machining as the need arises and may lead to a serious accident when persons other than the operator update, it is possible to disapprove the data update by the data management device, thereby increasing the security.

Incidentally, said telecommunication circuits according to the present invention includes various communication circuits for configuring network, such as LAN, VAN, and leased telephone circuits and optical communication circuits. In addition, said data for use in control includes various kinds of data, such as a machining program, the amounts of pitch error compensation, and the amounts of tool offset.

BRIEF DESCRIPTION OF THE DRAWINGS

FIG. 4 is an explanatory drawing illustrating a datatable stored in a first setting data storage section in accordance with the present embodiment.

FIG. 5 is an explanatory drawing illustrating a datatable stored in a second setting data storage section in accordance with the present embodiment.

DESCRIPTION OF THE PREFERRED EMBODIMENT

Figure 1:
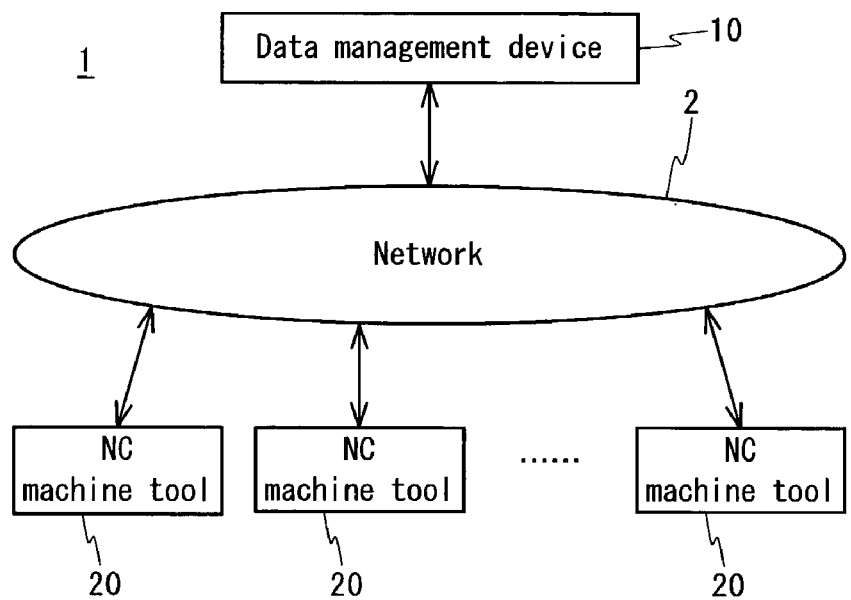
FIG. 1 is a block diagram illustrating an outline configuration of a data transmission system in accordance with one embodiment of the present invention.

Hereafter, the preferred embodiment of the present invention is described based on accompanying drawings. Incidentally, FIG. 1 is a block diagram illustrating an outline configuration of a data transmission system in accordance with one embodiment of the present invention. Moreover, FIG. 2 is a block diagram illustrating an outline configuration of a data management device in accordance with the present embodiment, and FIG. 3 is a block diagram illustrating an outline configuration of a control device in accordance with the present embodiment.

As illustrated in FIG. 1, a data transmission system 1 in accordance with the present embodiment is configured so that a data management device 10 arranged in a management side (management office or the like) may be connected to a plurality of NC machine tools 20 arranged in a machining site via a network 2, such as LAN.

Figure 2:
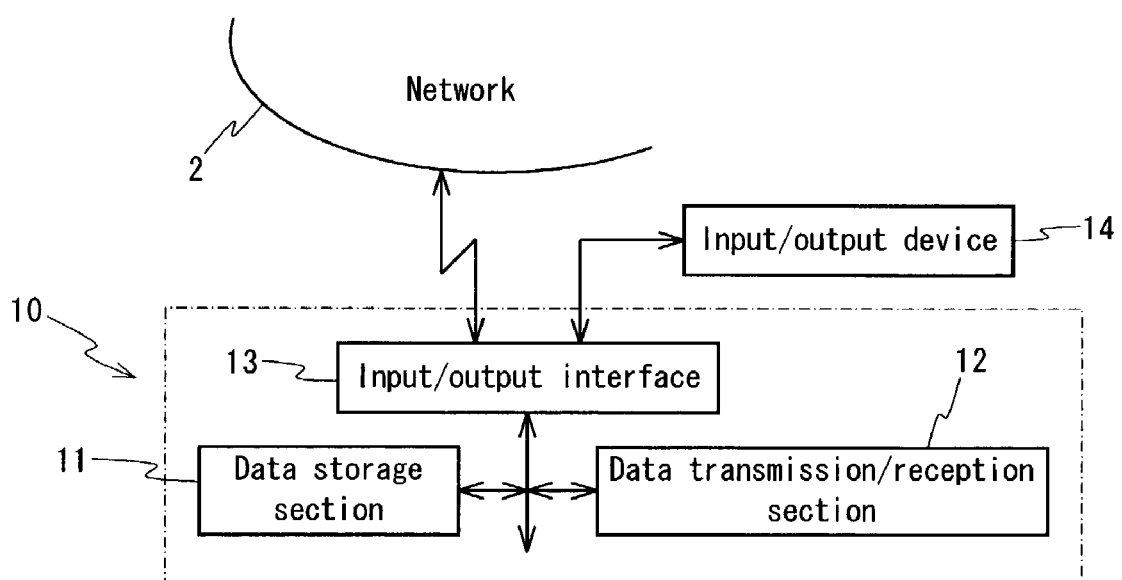
FIG. 2 is a block diagram illustrating an outline configuration of a data management device in accordance with the present embodiment.
Figure 3:
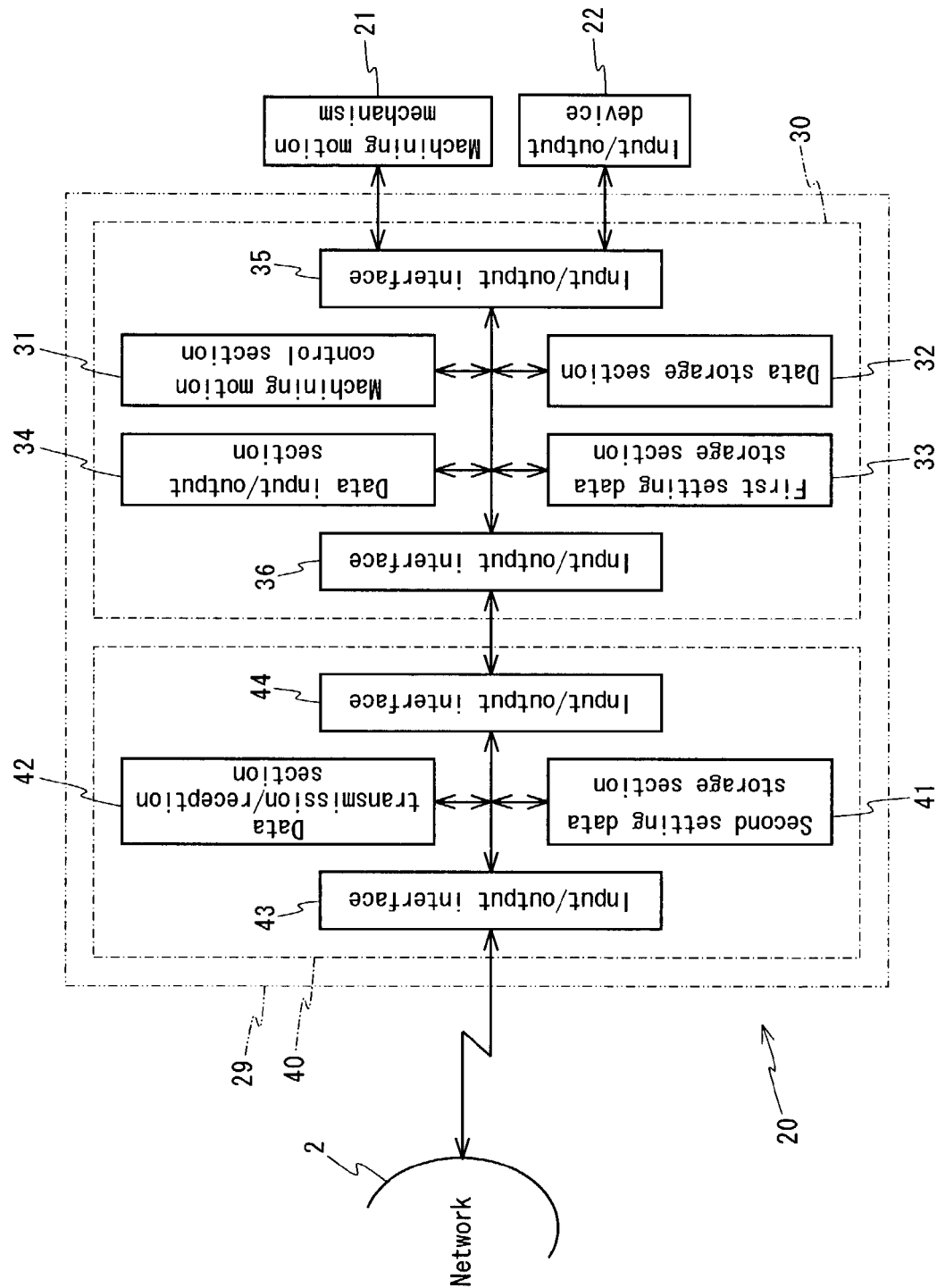
FIG. 3 is a block diagram illustrating an outline configuration of a control device in accordance with the present embodiment.

As illustrated in FIG. 2, said data management device 10 comprises a data storage section 11, a data transmission/reception section 12 and an input/output interface 13 which comprises a CPU, a ROM, a RAM, and an external storage device or the like, and an input/output device 14 connected to the input/output interface 13 or the like, and is connected to said network 2 via the input/output interface 13.

Said data storage section 11 is a functional section for storing data for use in control for numerically controlling a machining motion mechanism 21 of the NC machine tool 20 which will be explained hereinafter, and said data for use in control includes various kinds of data, such as a machining program, amounts of pitch error compensation, and amounts of tool offset.

Said data transmission/reception section 12 performs a process which transmits data stored in the data storage section 11 to said NC machine tool 20 via the network 2 and a process which receives data stored in the NC machine tool 20 via the network 2 to store in the data storage section 11, and in addition, a process which stores data inputted from the input/output device 14 in the data storage section 11 and a process which outputs the data stored in the data storage section 11 to the input/output device 14.

As illustrated in FIG. 3, said NC machine tool 20 comprises a machining motion mechanism 21 which comprises a main spindle unit, a feed mechanism or the like, an input/output device 22, and a control device 29 connected to these machining motion mechanism 21 and the input/output device 22 or the like.

Said control device 29 comprises a numerical control section 30 and a communication control section 40 which comprise a CPU, a ROM, a RAM, and an external storage device or the like, and these numerical control sections 30 and communication control section 40 are mutually connected.

Said numerical control section 30 comprises a machining motion control section 31, a data storage section 32, a first setting data storage section 33, a data input/output section 34, and input/output interfaces 35, 36 or the like, and said machining motion mechanism 21 and said input/output device 22 are connected to this input/output interface 35.

Said data storage section 32 is a functional section which stores the above-mentioned data for use in control or the like for numerically controlling the machining motion mechanism 21. Moreover, said first setting data storage section 33 is a functional section which stores setting data for determining whether or not to approve an output and an update on each data stored in data storage section 32, and the setting data is stored as a datatable as illustrated in FIG. 4.

Said data input/output section 34 is a functional section which controls an input/output from said input/output device 22 and also controls an input/output from said communication control section 40.

Specifically, when there is an update request for the data stored in the data storage section 32 from the input/output device 22, it refers to the setting data stored in said first setting data storage section 33 on a requested data item, then if it is an item which can be updated, it accepts a data input from the input/output device 22, and updates the data stored in the data storage section 32 by using the accepted data, on the other hand, if it is an item which cannot be updated, it performs a process which rejects the update request from the input/output device 22.

Moreover, when there is an output request for the data stored in the data storage section 32 from the input/output device 22, similarly, it refers to the setting data stored in said first setting data storage section 33 on a requested data item, then if it is an item which can be outputted, it performs a process which reads the requested data from the data storage section 32, and outputs the same to the input/output device 22, on the other hand, if it is an item which cannot be outputted, it performs a process which rejects the output request from the input/output device 22.

Moreover, when there is an update request for the data stored in the first setting data storage section 33 from the input/output device 22, it accepts a data input from the input/output device 22, and updates the data stored in the first setting data storage section 33 by using the accepted data, when there is an output request for the data stored in the first setting data storage section 33, it performs a process which reads the requested data from the first setting data storage section 33 to output the same to the input/output device 22.

Furthermore, the data input/output section 34 receives data which is transmitted from the communication control section 40, and updates the data which is stored in the data storage section 32 by the received data, on the other hand, performs a process which reads the data stored in the data storage section 32 to transmit the same to the communication control section 40 according to the request from the communication control section 40.

Then, said machining motion control section 31 controls the operation of said machining motion mechanism 21 based on the data for use in control (machining program, amounts of pitch error compensation, amounts of tool offset or the like) stored in the data storage section 32.

Said communication control section 40 comprises a second setting data storage section 41, a data transmission/reception section 42, input/output interfaces 43, 44 or the like, and is connected to said network 2 via this input/output interface 43. In addition, the communication control section 40 and said numerical control section 30 are mutually connected via the input/output interface 44 and said input/output interface 36.

Said second setting data storage section 41 is a functional section which stores setting data for determining whether or not to approve an output and an update on each data stored in data storage section 32, and the setting data is stored as a datatable illustrated in FIG. 5. Incidentally, it is possible for the setting data stored in this second setting data storage section 41 to be updated and outputted via said input/output device 22.

Said data transmission/reception sections 42 is a functional section which performs a reception process for the data transmitted from said data management device 10, and a transmission process for data according to a request from the data management device 10.

Specifically, when there is an update request for the data stored in the data storage section 32 from the data management device 10, it refers to the setting data stored in said second setting data storage section 41 on a requested data item, then if it is an item which can be updated, it performs a process which accepts a data transmission from the data management device 10, and transmits the accepted data to the numerical control section 30, on the other hand, if it is an item which cannot be updated, it rejects the update request from the data management device 10, and returns a message as such to the data management device 10.

Moreover, when there is an output request for the data stored in the data storage section 32 from the data management device 10, similarly, it refers to the setting data stored in said second setting data storage section 41 on a requested data item, then if it is an item which can be outputted, it performs a process which receives the requested data from the numerical control section 30, and transmits the same to the data management device 10, on the other hand, if it is an item which cannot be outputted, it performs a process which rejects the output request from the data management device 10, and returns a message as such to the data management device 10.

According to the data transmission system 1 of the present embodiment configured as mentioned above, data is inputted into the control device 29 from the data management device 10, and on the contrary, data is outputted to the data management device 10 from the control device 29 as follows.

First, a case where data is inputted will be described.

When data is transmitted from the data transmission/reception section 12 of the data management device 10 to the data transmission/reception section 42 of the communication control section 40 via the network 2, the data transmission/reception sections 42 refers to the setting data stored in the second setting data storage section 41 in receiving this, and judges whether the reception (update) is an approved data or not, if it is the approved data, then it receives and transmits this to the data input/output section 34, on the other hand, if it is not the approved data, then it returns a message, to that effect, to the data management device 10.

For example, in the example illustrated in FIG. 5, if the transmitted data is the data relating the machining program or the amounts of pitch error compensation, it will be judged as receivable and will be received from the data management device 10, and If the data relating the amounts of tool offset, it will be judged to as unreceivable and the reception will be rejected.

Then, when data is transmitted from the data transmission/reception section 42 via the input/output interface 44 and the input/output interface 36 to the data input/output section 34, the data stored in the data storage section 32 is updated by using the data by the data input/output section 34.

Next, a case where data is outputted will be described. When there is a request for data transmission from the data transmission/reception section 12 of the data management device 10 to the data transmission/reception section 42 of the communication control section 40 via the network 2, the data transmission/reception section 42 refers to the setting data stored in the second setting data storage section 41, and judges whether the requested data item is an approved data for transmission (output) or not, and if being the approved data, performs a transmission request to the data input/output section 34 on the requested data. On the other hand, if being the data which is not approved for output, it returns a message as such to the data management device 10.

For example, in the example illustrated in FIG. 5, if the requested data is data on the machining program, the amounts of pitch error compensation, or the amounts of tool offset, it will be judged as transmittable and the transmission request is performed to the data input/output section 34, if it is other untransmittable data, it will be judged as untransmittable and the transmission request is not performed to the data input/output section 34.

Then, the data input/output section 34, which receives the transmission request for data from the data transmission/reception section 42, reads the data stored in the data storage section 32 according to the request, and transmits the read data to the data transmission/reception section 42, the data transmission/reception section 42 transmits the received data to the data management device 10, and the data management device 10 stores the received data in said data storage section 11.

Thus, according to this data transmission system 1, since the transmittable/receivable data between the data management device 10 and the control device 29 of the NC machine tool 20 can be selectively set up for every data according to the importance or the like, for example, regarding the data, such as the amounts of tool offset, which needs to be updated in order for the operator to perform suitable machining operation as the need arises and may lead to a serious accident when persons other than the operator update, it is possible to disapprove the data update by the data management device 10, thereby increasing the security.

As mentioned above, although one embodiment of the present invention has been described, the specific embodiment which the present invention can employ is not limited to this at all.

For example, the data to be transmitted and received are not limited to the above-mentioned data for use in control, and there is no harm in including various data other than this.

In addition, although one data management device 10 and the plurality of NC machine tools 20 are connected via the network 2 in the above example, it is not limited to this, it may be configured so that the plurality of data management devices 10 and the plurality of NC machine tools 20 may be connected via the network 2.

In addition, in the above example, although the control device 29 is configured to be divided into two functional sections, the numerical control section 30 and the communication control section 40, these may also be configured to be integrally arranged as one functional section. In this case, said data transmission/reception section 42 is configured so as to directly read the data from the data storage section 32 without passing through said data input/output section and to transmit the same to the data management device 10, and is also configured so as to directly update the data stored in the data storage section 32 by using the data received from the data management device 10.

What is claimed is:

1. A control device capable of data communication, provided in a machine tool furnished with a machining motion mechanism and an input/output device performing an input/output of data, which numerically controls operation of the machining motion mechanism, and which is configured to enable a connection to a data management device via telecommunication circuits, comprising:

data storage means for storing at least data for use in control for numerically controlling said machining motion mechanism;

first setting data storage means for storing setting data corresponding to each data item stored in said data storage means, for determining whether or not to approve an input and an output of each data item stored in said data storage means;

data input/output means for performing a process which outputs data stored in said data storage means to said input/output device according to a request from said input/output device, while performing a process which accepts the data input from said input/output device and updates the data stored in said data storage means by the accepted data, and for performing said input process only on data which has been approved for an input and said output process only on data which has been approved for an output by referring to the corresponding setting data stored in said first setting data storage means when said data input/output means performs said input/output process, and data transmission/reception means for performing a process which transmits data stored in said data storage means to said data management device according to a request from said data management device, while performing a process which receives the data transmitted from said data management device and updates the data stored in said data storage means by the received data; wherein said control device further comprises second setting data storage means for storing setting data corresponding to each data item stored in said data storage means, for determining whether or not to approve the transmission and/or reception of each data item stored in said data storage means, and said data transmission/reception means performs said transmission and/or reception process only on data which has been approved for a transmission and/or reception by referring to the corresponding setting data stored in said second setting data storage means when performing said transmission and/or reception process.

2. A transmission system constructed by connecting the control device according to claim 1 which is capable of data communication to the data management device via telecommunication circuits.

* * * * *